US007046360B2

(12) United States Patent
Fujimoto et al.

(10) Patent No.: US 7,046,360 B2
(45) Date of Patent: May 16, 2006

(54) IMAGE PICKUP DEVICE

(75) Inventors: Masatoshi Fujimoto, Hamamatsu (JP); Shinichiro Aoshima, Hamamatsu (JP); Makoto Hosoda, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 415 days.

(21) Appl. No.: 10/258,450

(22) PCT Filed: Mar. 16, 2001

(86) PCT No.: PCT/JP01/02108

§ 371 (c)(1),
(2), (4) Date: Oct. 24, 2002

(87) PCT Pub. No.: WO01/84208

PCT Pub. Date: Nov. 8, 2001

(65) Prior Publication Data

US 2003/0095255 A1 May 22, 2003

(30) Foreign Application Priority Data

Apr. 27, 2000 (JP) ...................................... 2000-127887

(51) Int. Cl.
*G01J 3/28* (2006.01)
*G01J 4/00* (2006.01)

(52) U.S. Cl. ........................................ 356/326; 356/369

(58) Field of Classification Search ................. 356/369, 356/300–326, 600–636, 445–446; 382/154
See application file for complete search history.

(56) References Cited

U.S. PATENT DOCUMENTS 4,118,719 A 10/1978 Leiter et al. ................ 354/350
4,712,889 A 12/1987 Schindl ...................... 350/511
4,844,617 A * 7/1989 Kelderman et al. ......... 356/624
5,754,335 A 5/1998 Takagi et al. ............... 359/348

FOREIGN PATENT DOCUMENTS

| | | |
|---|---|---|
| EP | 0 211 590 | 2/1987 |
| JP | 5 181066 | 7/1993 |
| JP | 07-168103 | 7/1995 |
| JP | 7 199079 | 8/1995 |
| JP | 8 114753 | 5/1996 |

OTHER PUBLICATIONS

Wilson et al., "Theory and Practice of Scanning Optical Microscopy", Academic press, England, 1984, pp. 173–175.

Fujita et al., "New Optical Microscopes" Gakusai Kikaku K.K., p. 31.

* cited by examiner

*Primary Examiner*—Zandra V. Smith
(74) *Attorney, Agent, or Firm*—Morgan, Lewis & Bockius LLP

(57) ABSTRACT

In an imaging apparatus, a detection section 9 detects a beam $L_F$ having passed through an aperture 5 in a first direction and a location designation beam $L_B$ having passed through the aperture 5 in the opposite direction is made incident to a position (x,y) in a first light image IM1 on an image pickup surface corresponding to a specific position (x,y) in a second light image IM2, whereby the result of detection of the beam $L_F$ detected at the detection section 9 indicates data at a specific position in an incoming light image designated by the location designation beam $L_B$, regardless of whether there is a mechanical error in movement of the aperture 5.

7 Claims, 3 Drawing Sheets

OBJECT
0
COLLIMATING OPTICAL SYSTEM
1
IM1
IM2
2
IMAGE PICKUP DEVICE
3
3a
V
COMPUTER
10
S
C
(MAGNIFICATION -VARIABLE) IMAGING OPTICAL SYSTEM
4
APERTURE
5
DRIVING MECHANISM
6
C
$L_B$
$L_F$
LIGHT EMITTING SECTION
8
7
DETECTION SECTION
9
S

LD
ATTENUATOR
SPECTROSCOPE
PHOTODETECTOR
XY STAGE
8a
8b
8
7
F9a
9a
9
9b
S
F8a
F8b
LB
F5
LF
X
Y
6b
C
5
6a
4a
4
V
3
3a
2d
IM2
2a
2b
2c
IM1
1a
1
2
0

IMAGE PICKUP DEVICE

TECHNICAL FIELD

The present invention relates to imaging apparatus.

BACKGROUND ART

In recent years, attention is being focused on the refractive index change phenomenon of a medium under irradiation with high-intensity laser light. This phenomenon causes a change in a spectrum of light when the laser light is injected into the medium. Knowing the position in the medium where such spectrum change occurs is useful for analysis of the phenomenon.

On the other hand, there is the known technology concerning scanning laser microscopes. The scanning laser microscopes are apparatus configured to focus laser light emerging from an optical fiber, on an object, receive fluorescence appearing from the object, by another optical fiber, and guide the fluorescence therethrough to a detector, and can obtain an image by moving the object or an imaging system to scan. The entire region of the object is scanned using a photodiode as the detector to obtain the image, and the fluorescence is again sampled at a point of interest on the image and guided to a spectroscope.

Such apparatus is described in "Tony Wilson & Colin Sheppard, THEORY AND PRACTICE OF SCANNING OPTICAL MICROSCOPY (Academic press, England, 1984, pp. 173–175)" and "New Optical Microscopes, p. 31, supervised by Tetsuya Fujita and edited by Satoru Kawada, Gakusai Kikaku K.K."

There are also some known techniques of extracting light corresponding to a specific point in the microscopic field and measuring a spectrum thereof. In the ordinary microscope system, light collimated by an objective optical system is split into two beams by a light splitting optical system, one beam is guided through an imaging optical system to a camera, and the other beam is guided similarly through an imaging optical system to an optical fiber. It is preliminarily determined which point on pixels of the camera corresponds to the position of the end face of the optical fiber (an aperture), and this point is marked on an image obtained from the camera, whereby correspondence can be made between the position and the light sampled by the optical fiber.

For example, an XY stage is moved to bring a point of interest to the position marked on the image, and the point of interest is exposed to the light. Such apparatus is described in the foregoing document [Tony Wilson & Colin Sheppard, THEORY AND PRACTICE OF SCANNING OPTICAL MICROSCOPY (Academic press, England, 1984, pp. 176–177)].

DISCLOSURE OF THE INVENTION

In the conventional imaging apparatus, however, the spectrum measuring point in the image is determined from the drive position of the XY stage, and thus accurate measurement is difficult where there occurs an error in the driving of the XY stage. The present invention has been accomplished in view of this problem and an object of the invention is to provide imaging apparatus capable of picking up an incoming light image and detecting a light beam at a specific position in the incoming light image, regardless of whether there is a mechanical error of the aperture.

In order to solve the above problem, an imaging apparatus of the present invention comprises splitting means for splitting an input light image into first and second light images identical with the input light image; an image pickup device for focusing the first light image on an image pickup surface thereof and picking up the first light image; an aperture located at an image position of the second light image and letting a beam pass therethrough at a specific position in the second light image; a detection section for detecting the beam from the specific position, which has passed through the aperture in a first direction; and a light emitting section for emitting a location designation beam, which passes through the aperture in a direction opposite to the first direction, wherein the splitting means is arranged so that the location designation beam having passed through the aperture in the opposite direction is made incident to a position in the first light image on the image pickup surface corresponding to the specific position in the second light image.

Since this apparatus is constructed in the structure wherein the detection section detects the beam having passed through the aperture in the first direction and the location designation beam having passed through the aperture in the opposite direction is made incident to the position in the first light image on the image pickup surface corresponding to the specific position in the second light image, the result of detection of the beam detected at the detection section indicates data at the specific position in the incoming light image, which is designated by the location designation beam. The first light image and the location designation beam may be made incident simultaneously or can also be made incident at different timings, onto the image pickup surface.

The detection section preferably comprises a spectroscope into which the beam from the specific position is fed; and a photodetector which receives an output from the spectroscope, wherein the spectroscope such as a diffraction grating, a prism, or the like resolves the beam into a spectrum pattern and the photodetector receives it to output an electric signal according to spectrum intensity. The photodetector may be a single photodiode or may also be a CCD or MOS type image sensor.

Preferably, the splitting means comprises: a half mirror to which the input light image is incident and which reflects and transmits the input light image to output the first and second light images; a first imaging optical system for focusing one of the light images reflected and transmitted by the half mirror, as the first light image; a reflecting optical system located at an image position of the first light image; and a second imaging optical system for receiving the first light image reflected by the reflecting optical system, via the first imaging optical system and the half mirror and focusing the first light image on the image pickup surface. In this case, the location designation beam incident through the aperture in the opposite direction to the output direction of the second light image is reflected or transmitted by the half mirror to be incident through the second imaging optical system onto the image pickup surface.

Further, the splitting means may comprise, instead of the half mirror: a polarizing beam splitter; and first and second polarization converting elements placed on the input side of the input light image in the polarizing beam splitter and between the polarizing beam splitter and the first imaging optical system. In this case, the direction of polarization changes as the beam passes through the first polarization converting element, the polarizing beam splitter, and the second polarization converting element. The first light image reflected by the reflecting optical system is transmitted or reflected by the polarizing beam splitter, different from the first light image entering the reflecting optical system. When the location designation beam incident into the polarizing beam splitter is linearly polarized light with a predetermined polarization direction, it is feasible to optimize the ratio of the beam emerging toward the image pickup device and variably control the reflectance and transmittance of light, as compared with the half mirror. It is also possible to provide the half mirror with polarizing characteristics.

The input light image is preferably reflected light or transmitted light from an object exposed to illumination light, but the input light image may also be probe light radiated to pump light causing a change in a specific medium, or probe light radiated to a specific medium with a change caused by pump light.

BEST MODE FOR CARRYING OUT THE INVENTION

The imaging apparatus according to an embodiment will be described below. The same reference symbols will denote the same elements and redundant description will be omitted.

Figure 1:
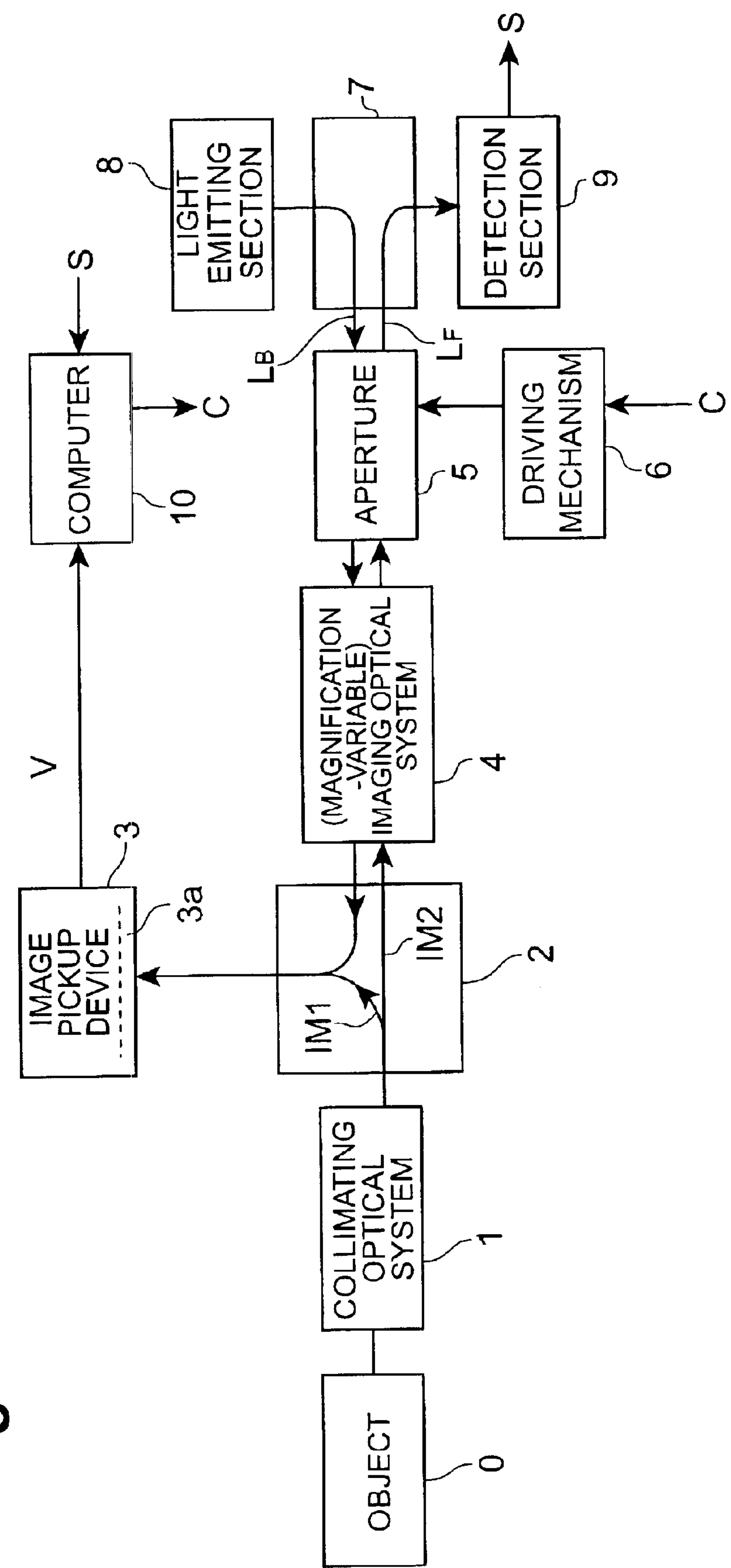
FIG. 1 is a block diagram of an imaging apparatus according to an embodiment of the present invention.

FIG. 1 is a block diagram of the imaging apparatus according to the present embodiment. An object O outputs a light image, the image of the object O (which will be referred to hereinafter as an input light image) passes through a collimating optical system 1 to be converted into collimated light, and the collimated light is incident to splitting means 2. The splitting means 2 splits the input light image into first and second light images IM1, IM2, which are images identical with the input light image. Let us define a specific position in the input light image as (x,y).

The first light image IM1 emerging from the splitting means 2 is guided to an image pickup device 3, and the image pickup device 3 picks up the first light image IM1 focused on an image pickup surface 3*a* thereof. The image pickup device 3 outputs a video signal V of the first light image IM1, and the video signal V is fed into a computer 10. The enlargement ratio, distortion, etc. of this image are determined by characteristics of the optics used. The image pickup device 3 can be a CCD camera and, particularly, either of a cooled CCD camera, an ICCD camera, an EB-CCD camera, and so on.

The second light image IM2 emerging from the splitting means 2 passes through an imaging optical system 4 to be focused at the position of the focal point thereof. Located at the image position of the second light image IM2 is an aperture 5 which lets a beam pass at the specific position (x,y) in the second light image IM2. The beam $L_F$ from the specific position (x,y), having passed through the aperture 5 in a first direction, is guided through second splitting means 7 to a detection section 9 to be detected by the detection section 9. Here the aperture 5 is movable in the XY plane and is arranged to be moved by a driving mechanism 6. The driving mechanism 6 is driven according to a control signal C from a computer 10. The specific position (x,y) indicates coordinates in the input light image on the image plane (XY plane) including the aperture 5. The detection section 9 outputs an electric signal S according to the beam $L_F$ from the specific position (x,y), and this signal is fed into the computer 10. It is important to fix the positional relation between the aperture 5 and the detection section 9, and it can be implemented well, for example, by the use of an optical fiber or the like.

The apparatus is provided with a light emitting section 8 for emitting a location designation beam $L_B$, which passes through the aperture 5 in the direction opposite to the aforementioned first direction. Namely, the location designation beam $L_B$ emitted from the light emitting section 8 is guided through the second splitting means 7 into the aperture 5 and then outputted therefrom. The location designation beam $L_B$ having passed through the aperture 5 in the opposite direction is guided through the imaging optical system 4 and the splitting means 2 to the image pickup device 3. Describing it in more detail, the location designation beam $L_B$ is incident to the position (x,y) in the first light image IM1 on the image pickup surface 3*a* corresponding to the specific position (x,y) in the second light image IM2. In other words, the splitting means 2 is arranged so that the location designation beam $L_B$ having passed through the aperture 5 in the opposite direction is made incident to the position (x,y) in the first light image IM1 on the image pickup surface 3*a* corresponding to the specific position (x,y) in the second light image IM2.

It is also desirable herein similarly to fix the positional relation between the light emitting section 8 and the aperture 5, and this can be implemented well, for example, by the use of an optical fiber or the like.

Since the imaging apparatus is constructed in the structure wherein the detection section 9 detects the beam $L_F$ having passed through the aperture 5 in the first direction and the location designation beam $L_B$ having passed through the aperture 5 in the opposite direction is made incident to the position (x,y) in the first light image IM1 on the image pickup surface 3*a* corresponding to the specific position (x,y) in the second light image IM2, it is readily understood that the result of detection of the beam $L_F$ detected at the detection section 9 indicates data associated with the specific position (x,y) in the incoming light image, which is designated on the first light image IM1 by the location designation beam $L_B$.

The first light image IM1 and the location designation beam $L_B$ may be made incident simultaneously or can also be made incident at different timings, onto the image pickup surface 3*a* of the image pickup device 3. In order to suppress background light, it is preferable to shut off the location designation beam $L_B$ during the detection of the beam $L_F$ at the detection section 9.

The computer 10 stores the first light image IM1 (input light image) and the position (x,y) of incidence of the location designation beam $L_B$ on the image pickup surface 3*a* and also stores the signal S from the detection section 9 in correspondence therewith. By moving the aperture 5 in the XY plane to scan, for example, one can simply designate a position (x,y) in the input light image to gain a signal S corresponding to that position.

The imaging apparatus is able to pick up the incoming light image by the image pickup device 3 and designate the specific position (x,y) in the incoming light image by the location designation beam $L_B$ incident to the image pickup device 3, regardless of whether there is a mechanical error of the aperture 5, and to detect the beam at this position by the detection section 9.

Figure 2:
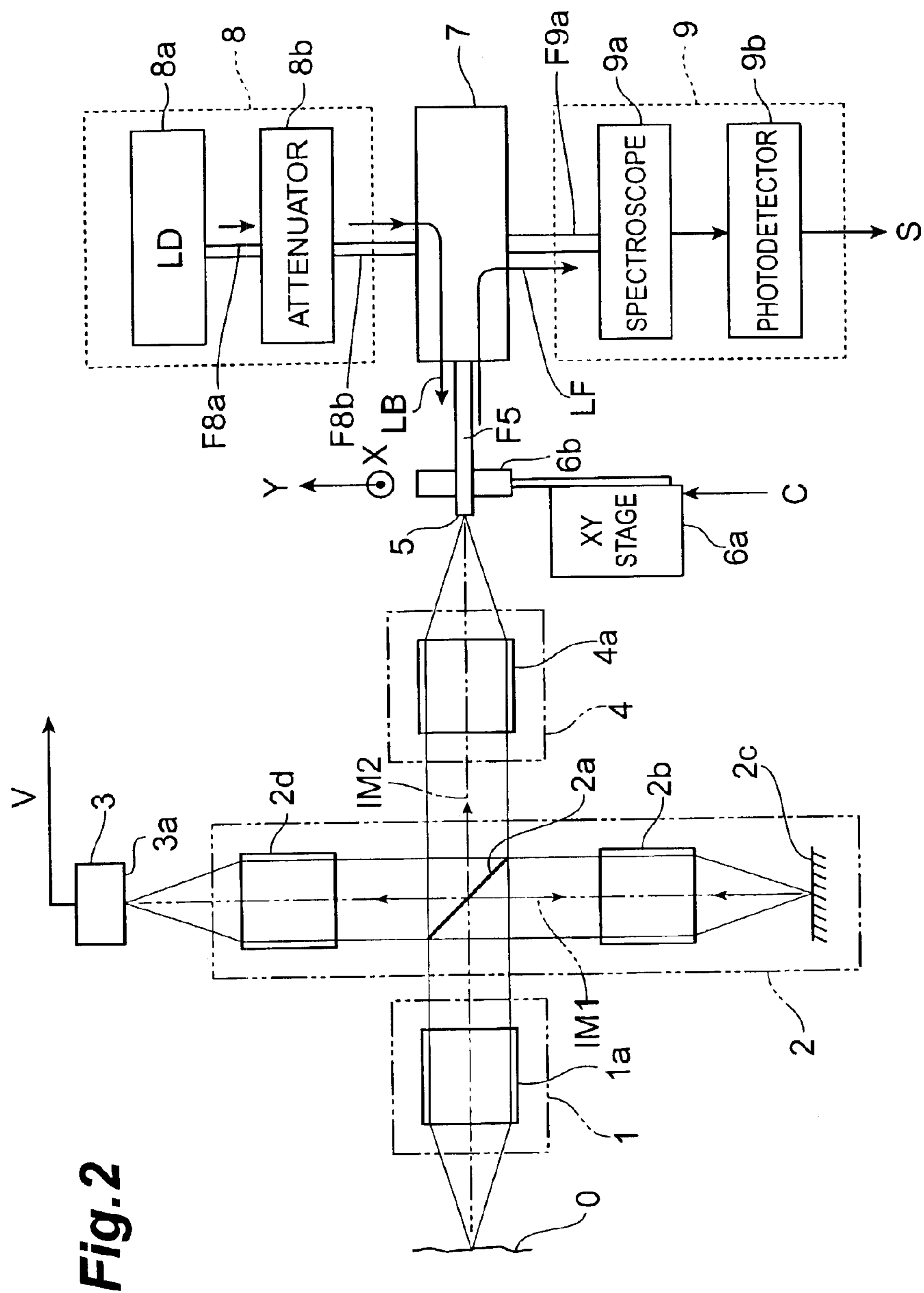
FIG. 2 is a system block diagram showing a preferred example of the imaging apparatus.

FIG. 2 is a system block diagram showing a preferred example of the above imaging apparatus. In this example, the input light image is reflected light or transmitted light from the object O exposed to illumination light.

The input light image is converted into collimated light by a collimator lens (e.g., an objective lens) 1*a*, the collimated light is reflected (as the first light image IM1) by a half mirror 2*a*, the reflected light is focused at the focal position by an imaging optical system 2*b*, the light is then reflected by a reflecting optical system (e.g., a plane reflector) 2*c* placed at the focal position, the reflected light then passes through the imaging optical system 2*b* in the opposite direction to be converted into a parallel beam, the parallel beam thereafter passes through the half mirror 2*a*, and the beam is focused at the focal position of an imaging optical system 2*d* thereby. The image pickup device 3 is placed at this image position and the first light image IM1 is focused on the image pickup surface 3*a* thereof. The imaging optical systems 2*b*, 2*d* can be camera lenses with the focal length of infinity.

On the other hand, the light (second light image IM2) collimated by the collimator lens 1*a* and transmitted by the half mirror 2*a* is incident in an as-collimated state into an imaging optical system 4*a* to be focused at the focal position thereof. The imaging optical system 4*a* can be a camera lens with the focal length of infinity. An end face of an optical fiber F5 as an aperture 5 is located at the image position. The optical fiber F5 is moved in the XY plane (a plane parallel to the image plane specified by the two orthogonal axes X, Y) by XY stage 6*a* and holder 6*b* constituting a driving mechanism (optical fiber position variator) 6. Namely, the holder 6*b* holds an end portion of the optical fiber F5, and the fiber end face 5 moves as the XY stage 6*a* moves the holder 6*b* in the XY plane. For controlling this movement, it is also possible, for example, to provide the XY stage 6*a* with an electric driving device and supply the control signal C from the outside to drive the XY stage 6*a*.

The beam $L_F$ having passed through the optical fiber F5 is incident through an optical fiber coupler 7 into a spectroscope 9*a* to be separated into its spectral components, which are incident to a photodetector 9*b*. Namely, the detection section 9 consists of the spectroscope 9*a* into which the beam $L_F$ from the specific position (x,y) is fed, and the photodetector 9*b* which receives an output from the spectroscope 9*a*. The beam $L_F$ is spectrum-resolved (wavelength-resolved) by the spectroscope 9*a* such as a diffraction grating, a prism, or the like, the photodetector 9*b* receives the resultant pattern, and the photodetector 9*b* outputs an electric signal according to spectrum intensity. The photodetector 9*b* may be a single photodiode, and it may also be a CCD or MOS type image sensor. Either one of these is selected according to the dynamic range of intensity of detected light or the like.

The light emitting section 8 is constructed, for example, of a laser diode 8*a* and an attenuator 8*b* connected by an optical fiber F8*a*, and output light from the attenuator 8*b* is guided through an optical fiber F8*b* into the optical fiber coupler 7. The attenuation factor of the attenuator 8*b* is adjusted while monitoring the intensity of the aperture image on the image pickup surface by the image pickup device 3.

The optical fiber coupler 7 may consist of an optical circulator, or an optical switch for switching of passage of beams. The location designation beam $L_B$ emerging from the light emitting section 8 is guided through the optical fiber coupler 7 and out of the aperture 5, it is then converted into a parallel beam by the imaging optical system 4*a*, and the parallel beam is reflected by the half mirror 2*a* to travel through the imaging optical system 2*d* onto the image pickup surface 3*a* of the image pickup device 3. Namely, the imaging optical system 2*d* forms an image of the aperture 5 (the aperture image) on the image pickup surface 3*a*.

The relative sizes of the input light image and the aperture image on the image pickup surface 3*a* are irrespective of the enlargement ratio of the imaging optical system 2*d*. On the other hand, with increase in the enlargement ratio of the imaging optical system 4*a*, the spatial region of the beam guided to the aperture 5 decreases and the aperture image on the image pickup surface 3*a* also becomes smaller. In the present example, the imaging optical system 4*a* is arranged to be variable in the enlargement ratio (magnification), so as to permit change in the spatial regions of these images.

If a reflecting optical system is placed instead of the aperture 5 on the image plane of the imaging optical system 4*a*, part of reflected light will form an image corresponding to the second light image IM2 on the image pickup surface 3*a*. The optical systems are preliminarily adjusted so that the image thus formed perfectly agrees with the first light image IM1. Namely, the image focused on the image pickup surface 3*a* from the beam $L_B$ emitted from the aperture 5 on the image plane of the imaging optical system 4*a* contains information about the position of the image of the object O on the image plane, and this information can be extracted by picking up the aperture image (the core image of the optical fiber F5) simultaneously with the first light image IM1 on the image pickup surface 3*a* and observing the spot position (aperture image) on this image. This permits the wavelength, intensity, etc. Of the light extracted at the detection section 9 to be measured while accurately monitoring the position where the light is extracted and measured in the object O. The size of the foregoing spot depends upon the region from which the light is extracted in the object O.

The present example described an example in which the light from the specific position, having passed through the aperture, was detected by the use of the spectroscope and photodetector, but the detection method does not have to be limited to this example; for example, a temporal waveform may be investigated by the use of a fast photodiode and an oscilloscope. A further possible example is such that the aperture is of slit shape and a streak camera is used to obtain a one-dimensional temporal waveform at a time. Another possible example is measurement by frequency resolved optical gating (FROG) as described in J. Opt. Soc. Am. B/Vol.11, NO. 11, p. 2206–2215, 1994.

The aforementioned example employed the configuration wherein the beam first reflected by the half mirror 2*a* was defined as the first light image IM1 and the transmitted beam as the second light image IM2, but the relation of these reflected and transmitted beams may be reversed. Among the optical systems 1*a*, 2*b*, 2*d*, 4*a*, any two systems can have the telecentric or conjugate relation.

In the present example, as described above, the splitting means 2 is comprised of the half mirror 2*a* to which the input light image is incident and which reflects and transmits the input light image to output the first and second light images IM1, IM2; the first imaging optical system 2*b* for focusing one of the light images reflected and transmitted by the half mirror 2*a*, as the first light image IM1; the reflecting optical system 2*c* placed at the image position of the first light image IM1; and the second imaging optical system 2*d* for receiving the first light image IM1 reflected by the reflecting optical system 2*c*, via the first imaging optical system 2*b* and the half mirror 2*a* and focusing the first light image IM1 on the image pickup surface 3*a*. In this case, the location designation beam $L_B$ traveling from the aperture 5 in the direction opposite to the emerging direction of the second light image IM2 is reflected or transmitted by the half mirror 2*a* to be incident through the second imaging optical system 2*d* onto the image pickup surface 3*a*.

As described previously, it is also possible to make the first light image IM1 and the location designation beam $L_B$ incident at different timings on the image pickup surface 3*a* of the image pickup device 3. For suppressing the background light, it is preferable to shut off the location designation beam $L_B$ during the detection of the beam $L_F$ at the detection section 9. For detecting another measurement position at the detection section 9, the aperture 5 is moved, the location designation beam $L_B$ is then emitted through the aperture 5 to project the aperture image again onto the image pickup surface 3*a*, and at a stage before it, or after the projection, the beam $L_F$ is detected at the detection section 9.

The spatial range of the light incident into the aperture 5 can be freely set by changing the aperture diameter of the aperture 5 or by changing the optical constant of the imaging optical system 4*a*. In this case, there is no change in the two-dimensional shape of the second light image IM2.

Figure 3:
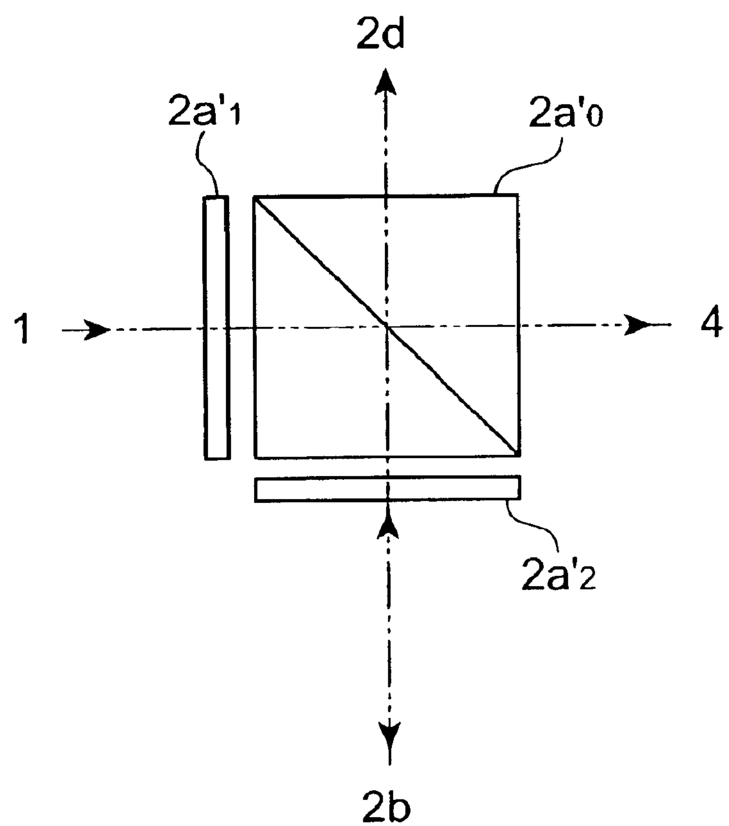
FIG. 3 is a schematic illustration showing another example of major part of splitting means 2 in FIG. 2.

FIG. 3 is a schematic illustration showing another example of the major part of the splitting means 2 shown in FIG. 2. Namely, in the present example, the splitting means 2 is comprised of a polarizing beam splitter $2a_0$'; and a first polarization converting element $2a_1$' and a second polarization converting element $2a_2$' placed on the input side of the input light image in the polarizing beam splitter $2a_0$' and between the polarizing beam splitter $2a_0$' and the first imaging optical system 2*b*, instead of the half mirror 2*a*.

Here the polarizing beam splitter $2a_0$' is one transmitting p-polarized light and reflecting s-polarized light. The first polarization converting element $2a_1$' consists of a half-wave plate, and the second polarization converting element $2a_2$' consists of a quarter-wave plate. Suppose the input light image is linearly polarized light and it is converted into linearly polarized light with an arbitrary direction of polarization as transmitted by the first polarization converting element $2a_1$'. Only the s-polarization component of the transmitted light is reflected by the polarizing beam splitter $2a_0$' to be emitted toward the imaging optical system 2*b*. Since this beam is reflected backward, it travels twice in total through the second polarization converting element $2a_2$', so as to be converted into linearly polarized light with the polarization direction rotated 90° (or converted into p-polarized light). Then it travels through the polarizing beam splitter $2a_0$' toward the imaging optical system 2*d*.

For increasing the reflectance of the first light image IM1 in the polarizing beam splitter $2a_0$', the coincidence level of the foregoing polarization direction is adjusted (i.e., the s-polarization component is relatively increased) to enhance the intensity of the first light image IM1 on the image pickup surface. For increasing the transmittance of the second light image IM2 in the polarizing beam splitter $2a_0$', the coincidence level of the foregoing polarization direction is adjusted (i.e., the p-polarization component is relatively increased) to enhance the intensity of the second light image IM2 on the aperture 5.

In order to implement satisfactory detection across a wide band, the first and second polarization converting elements (half-wave plate and quarter-wave plate) $2a_1$', $2a_2$' are preferably of the first order. The second polarization converting element $2a_2$' can also be a 45° polarization rotator instead of the quarter-wave plate. It is also possible to employ a Babinet-Soleil element.

In the present example, the polarization direction varies as the beam travels through the first polarization converting element $2a_1$', the polarizing beam splitter $2a_0$', and the second polarization converting element $2a_2$'. The first light image IM1 reflected by the reflecting optical system 2*c* is transmitted or reflected by the polarizing beam splitter $2a_0$', different from that traveling toward the reflecting optical system 2*c*. When the location designation beam incident into the polarizing beam splitter $2a_0$' is linearly polarized light with a predetermined polarization direction, it is feasible to optimize the ratio of the beam emitted toward the image pickup device 3 and variably control the reflectance and transmittance of light, as compared with the half mirror 2*a*. The half mirror 2*a* may be provided with the polarizing characteristics. The laser light emerging from the aperture 5 is properly adjusted in such a polarization direction that the laser beam is incident onto the image pickup device 3.

The foregoing input light image can be probe light under irradiation with strong pulsed light (pump light) that can excite or change a specific medium.

Figure 4:
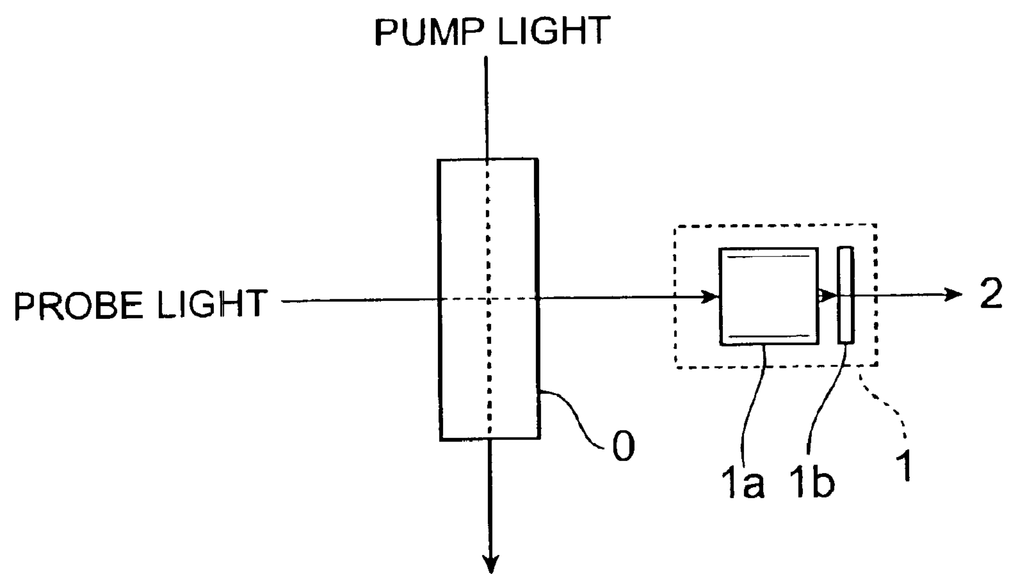
FIG. 4 is a schematic illustration showing a modified part of the imaging apparatus where the object O in FIG. 1 is the aforementioned specific medium.

FIG. 4 is a schematic illustration showing a modified portion of the imaging apparatus where the object O in FIG. 1 is the foregoing specific medium. Such a configuration is described in Japanese Patent Application Laid-Open No. 2000-283854 (photon track detecting apparatus).

Let us suppose that the object O is, for example, a gas or a liquid confined in a quartz glass cell, or a solid adequately transparent to the pump light and probe light. The pump light is assumed to be linearly polarized light with the electric field vector along the direction perpendicular to the plane of the drawing, and the probe light linearly polarized light with the electric field vector along the 45° direction relative to the plane of the drawing. In this case, if the intensity of the pump light is very high, the refractive index will anisotropically vary in a pump light existing area in the object O and the state of polarization of the probe light will vary according to an intensity distribution of the pump light.

If an analyzer 1*b* is placed so as to transmit only the perpendicular component relative to the polarization direction of the incident probe light, it will allow only components of the probe light modulated by the pump light to pass and enter the splitting means 2. Namely, an image obtained at the image pickup device 3 at this time is one representing an instantaneous intensity distribution of the pump light. FIG. 4 shows a configuration wherein the analyzer 1*b* is placed behind the collimating optical system 1*a*, but it is also possible to employ a reverse configuration thereto (wherein the analyzer is placed in front of 1*a*).

This apparatus is arranged to inject the probe light into the object O normally to and at the same timing as the pump light, whereby it can measure the instantaneous profile of the pump light through the spatial modulation effected on the probe light. The pump light existing area is located on the focal plane of the collimating optical system 1*a*.

If the pump light is very strong, the action of its strong electric field and magnetic field will subject the object O to very fast index modulation because of a breakdown, ablation, the nonlinear optical effect, and so on. When the probe light is injected into that area, the fast index modulation changes the probe light into a spectrum different from its incident spectrum. This spectrum change represents nothing but the process of the change of the object O.

Namely, the present example permits direct measurement of how the pump light acts on the object O at a specific position in the pump light and at a specific time. After an image has been taken, the analyzer 1*b* can be rotated about the traveling direction of the light. In this case, the detection section 9 (FIG. 2) can detect spectrum shifts of the probe light for a plurality of polarization directions.

Besides the present embodiment, it is needless to mention that the first light image can be another light image, for example, one obtained by image pickup of a schlieren image, a shadowgraph image, or the like. The directions of incidence of the pump light and the probe light do not always have to be normal to each other, but they may be freely set according to a measured object. Further, the pump light and the probe light do not have to be injected perfectly at the same timing, but it is also possible, for example, to employ such arrangement that the pump light first causes some change in the specific medium and during the change the probe light is injected to allow investigation of change states of the medium.

As described above, the imaging apparatus of the present invention has permitted the image pickup of the incoming light image and the detection of the beam at the specific position in the incoming light image, irrespective of whether there is a mechanical error of the aperture.

INDUSTRIAL APPLICABILITY

The present invention is applicable to the imaging apparatus.

What is claimed is:

1. An imaging apparatus comprising:

splitting means for splitting an input light image into first and second light images identical with the input light image;

an image pickup device for focusing the first light image on an image pickup surface thereof and picking up the first light image;

an aperture located at an image position of the second light image and letting a beam pass therethrough at a specific position in the second light image;

a detection section for detecting the beam from said specific position, which has passed through said aperture in a first direction; and a light emitting section for emitting a location designation beam, which passes through said aperture in a direction opposite to said first direction, wherein said splitting means is arranged so that said location designation beam having passed through said aperture in the opposite direction is made incident to a position in the first light image on the image pickup surface corresponding to the specific position in the second light image.

2. The imaging apparatus according to claim 1, wherein said detection section comprises a spectroscope into which the beam from said specific position is fed; and a photodetector which receives an output from said spectroscope.

3. The imaging apparatus according to claim 1, wherein said splitting means comprises:

a half mirror to which said input light image is incident and which reflects and transmits the input light image to output the first and second light images;

a first imaging optical system for focusing one of the light images reflected and transmitted by said half mirror, as said first light image;

a reflecting optical system located at an image position of the first light image; and a second imaging optical system for receiving the first light image reflected by said reflecting optical system, via said first imaging optical system and said half mirror and focusing the first light image on said image pickup surface.

4. An imaging apparatus comprising:

splitting means for splitting an input light image into first and second light images identical with the input light image;

an image pickup device for focusing the first light image on an image pickup surface thereof and picking up the first light image;

an aperture located at an image position of the second light image and letting a beam pass therethrough at a specific position in the second light image;

a detection section for detecting the beam from said specific position, which has passed through said aperture in a first direction; and a light emitting section for emitting a location designation beam, which passes through said aperture in a direction opposite to said first direction, wherein said splitting means is arranged so that said location designation beam having passed through said aperture in the opposite direction is made incident to a position in the first light image on the image pickup surface corresponding to the specific position in the second light image;

wherein said splitting means comprises:

a polarizing beam splitter to which said input light image is incident and which reflects and transmits the input light image to output the first and second light images;

a first imaging optical system for focusing one of the light images reflected and transmitted by said polarizing beam splitter, as said first light image;

first and second polarization converting elements placed on the input side of said input light image in said polarizing beam splitter and between said polarizing beam splitter and said first imaging optical system;

a reflecting optical system located at an image position of the first light image; and a second imaging optical system for receiving the first light image reflected by said reflecting optical system, via said first imaging optical system and said half mirror and focusing the first light image on said image pickup surface.

5. The imaging apparatus according to claim 1, wherein said input light image is reflected light or transmitted light from an object exposed to illumination light.

6. The imaging apparatus according to claim 1, wherein said input light image is probe light radiated to pump light causing a change in a specific medium.

7. The imaging apparatus according to claim 1, wherein said input light image is probe light radiated to a specific medium with a change caused by pump light.

* * * * *